(12) United States Patent
Ducaroir et al.

(10) Patent No.: US 6,330,591 B1
(45) Date of Patent: Dec. 11, 2001

(54) HIGH SPEED SERIAL LINE TRANSCEIVERS INTEGRATED INTO A CACHE CONTROLLER TO SUPPORT COHERENT MEMORY TRANSACTIONS IN A LOOSELY COUPLED NETWORK

(75) Inventors: Francois Ducaroir, Santa Clara; Karl S. Nakamura, Palo Alto; Michael O. Jenkins, San Jose, all of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/036,897

(22) Filed: Mar. 9, 1998

(51) Int. Cl.[7] ....................................... G06F 13/38
(52) U.S. Cl. ................. 709/213; 709/214; 709/216; 709/218; 711/146; 711/130; 711/124; 710/71
(58) Field of Search ......................... 711/141, 146, 711/130, 124; 709/200, 213, 214, 216, 217, 218, 219; 710/65, 71

(56) References Cited

U.S. PATENT DOCUMENTS

| | | |
|---|---|---|
| 4,486,739 | 12/1984 | Franaszek et al. . |
| 4,845,609 * | 7/1989 | Lighthart et al. ............... 709/200 |
| 5,420,991 * | 5/1995 | Konigsfeld et al. ............. 711/150 |
| 5,572,703 * | 11/1996 | MacWilliams et al. .......... 711/146 |
| 5,796,977 * | 8/1998 | Sarangdhar et al. ............... 709/1 |
| 5,829,037 * | 10/1998 | Sachs ............................. 711/141 |

OTHER PUBLICATIONS

Lenoski, "The Design and Analysis of Dash: A Scalable Directory–Based Multiprocessor," A Dissertation submitted to the Dept. of Electrical Engineering and the Committee on Graduate Studies of Stanford University in partial fulfillment of the requirements for the degree of Doctor of Philosophy, Dec. 1991.

* cited by examiner

Primary Examiner—B. James Peikari
(74) Attorney, Agent, or Firm—Conley, Rose & Tayon

(57) ABSTRACT

One or more improved transmit units tightly integrated into an enhanced cluster cache with controller. Coherent memory transactions in a loosely coupled computer network are supported by sending all cache updates to all computers in the loosely coupled computer network through high speed, low latency and high bandwidth serial lines linking all computers to all other computers. The cluster cache controller may include a local cache controller and/or as a local bus controller. The local bus controller is operable to coupled the cluster cache to an I/O subsystem. A local cache memory preferably caches data and/or instructions, or locations thereof for the entire computer, making the local computer cache available to the entire computer cluster through the transmit unit. Each transfer unit is a full-duplex transceiver that includes transmitter and receiver functions. Each transfer unit can send and receive data simultaneously since operation of their transmitter and receiver functions are independent. Each transmit unit comprises a receiver operably coupled between an input port and an output port, and a timing generator coupled to recover a clock signal from the serialized data and to synchronize the deserialized data from the recovered clock. Also included are a transmitter which receives parallel data and transmits a serial data stream. The parallel data are received concurrently with the serialized data being received. A deserializer is coupled to convert the serialized data into the deserialized data. A serializer is coupled to convert the parallel data into the serial data stream.

16 Claims, 5 Drawing Sheets

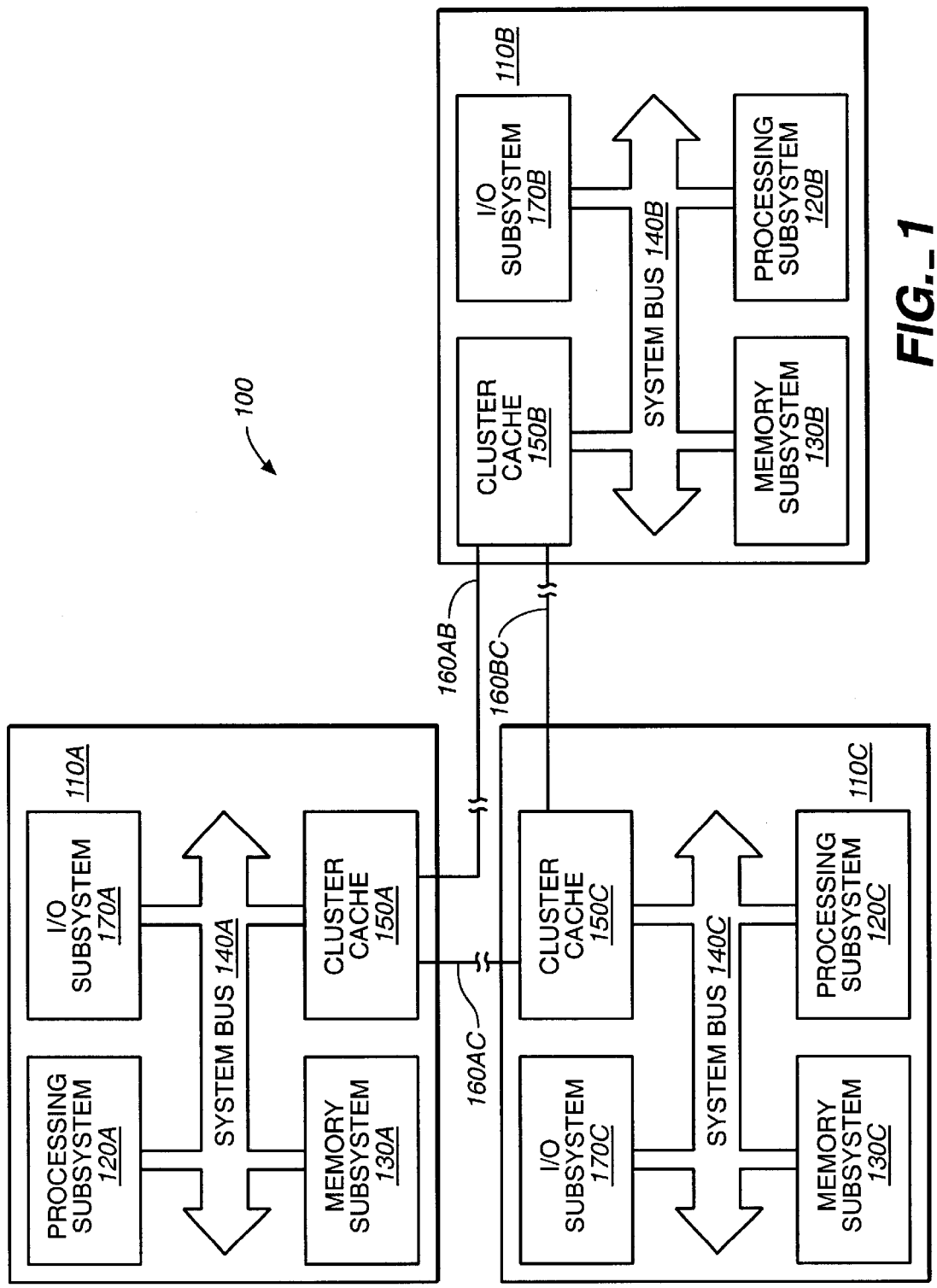
FIG._1

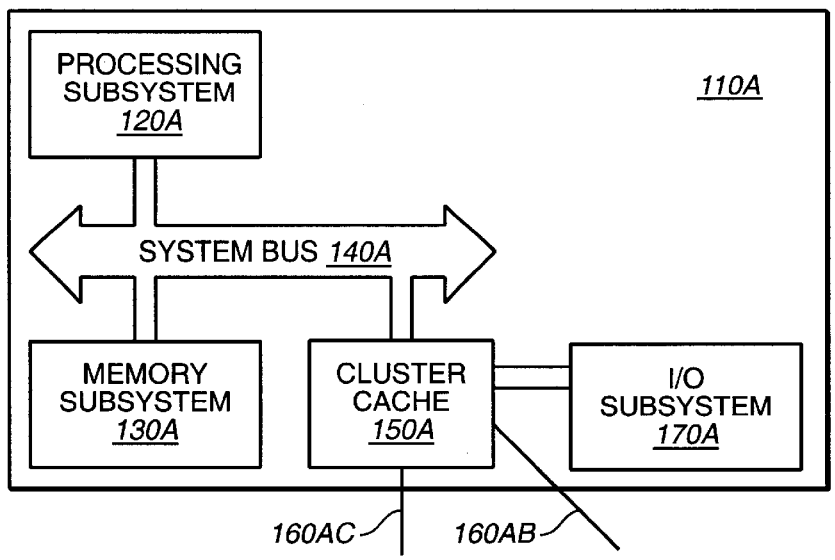
FIG._2A
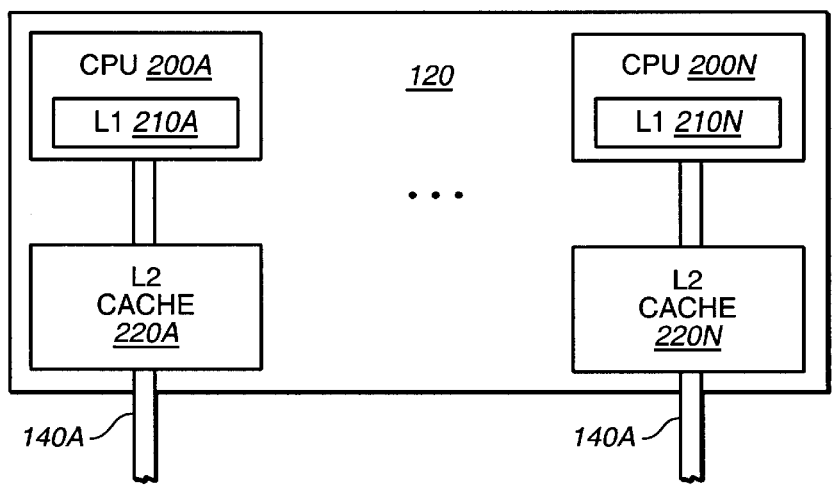
FIG._2B
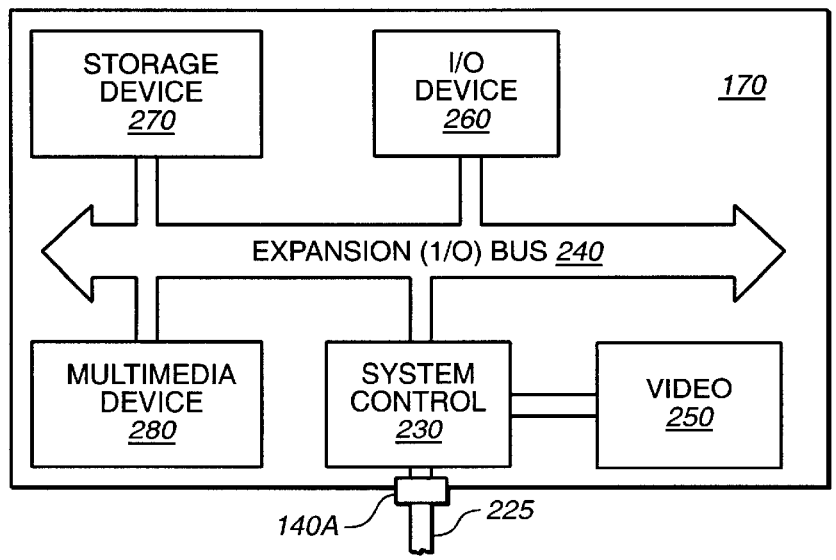
FIG._12C

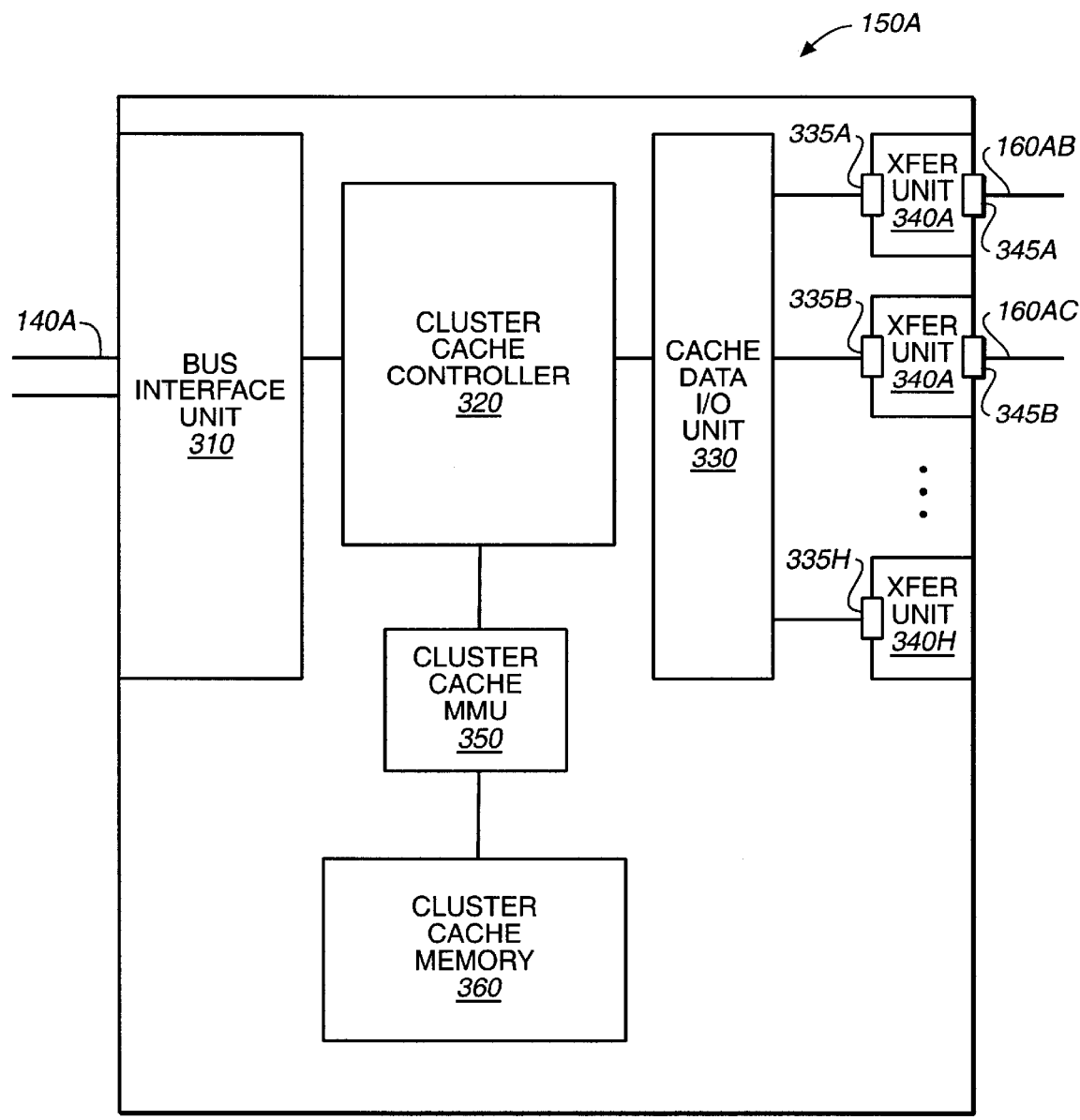
FIG._3A

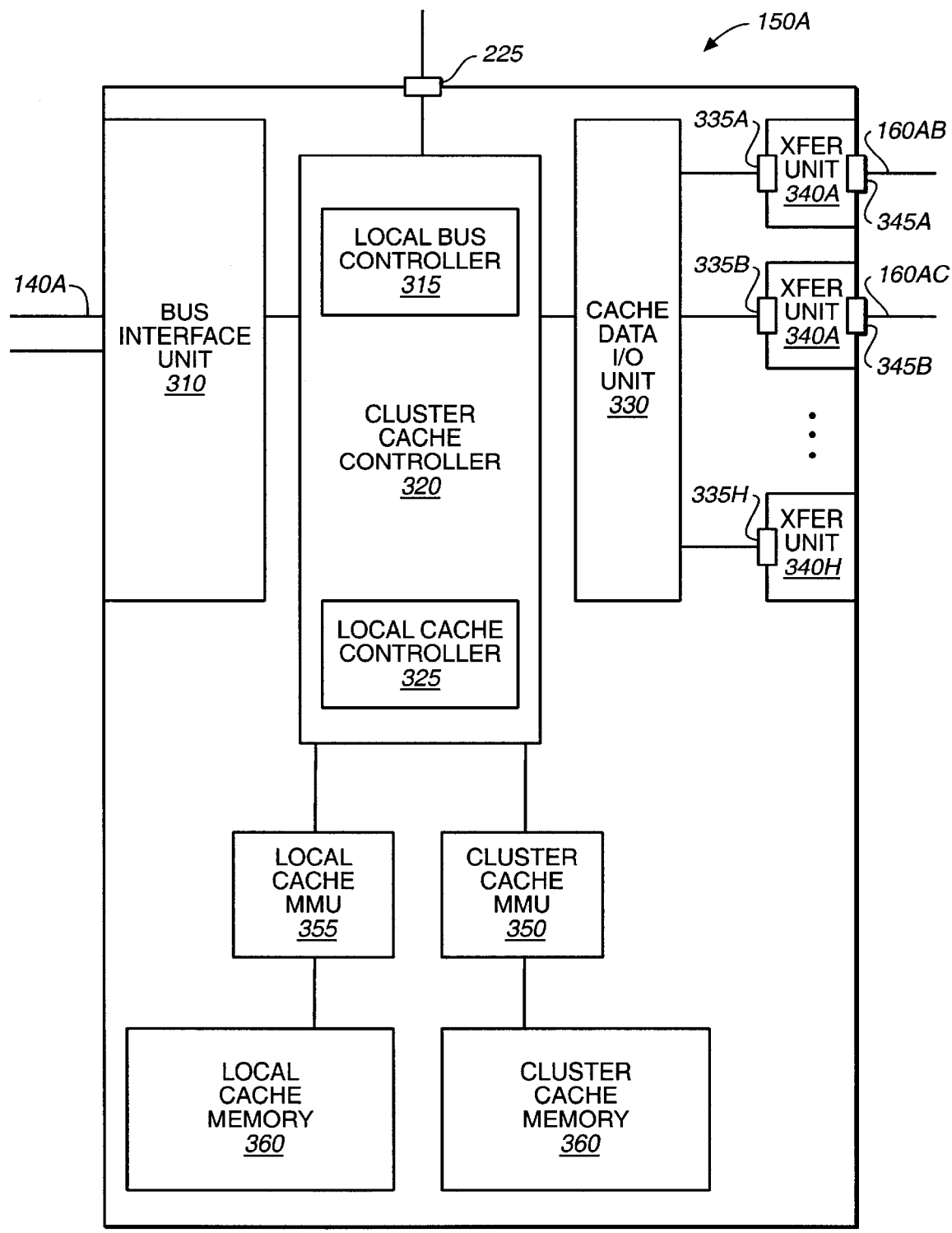
FIG._3B

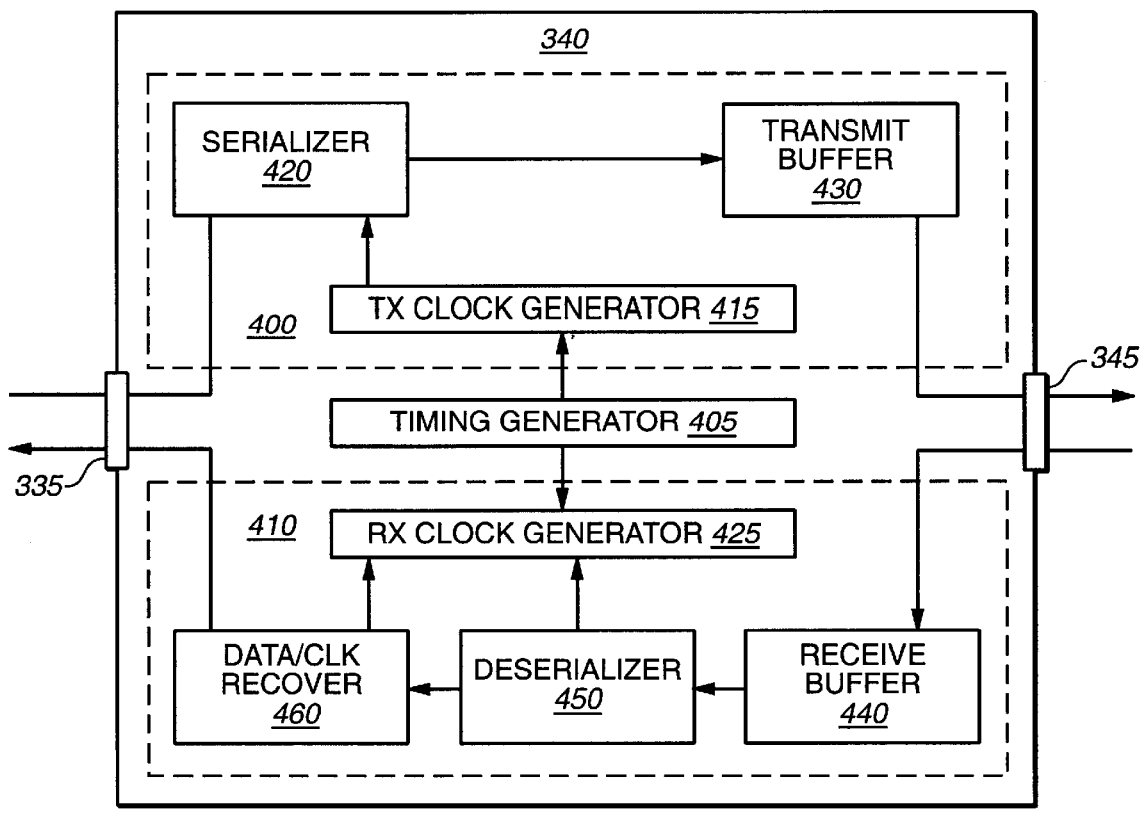
FIG._4

HIGH SPEED SERIAL LINE TRANSCEIVERS INTEGRATED INTO A CACHE CONTROLLER TO SUPPORT COHERENT MEMORY TRANSACTIONS IN A LOOSELY COUPLED NETWORK

This invention relates to computer systems in general and, more particularly, to a high speed serial line transceiver integrated into a cache controller component to support coherent memory transactions in a loosely coupled computer network.

DESCRIPTION OF RELATED ART

The concept of maintaining cache coherency in a tightly coupled computer network is generally well known. Tightly coupled generally implies that the computer clusters or computer processors which make up the computer network are housed in a single enclosure. Because the computer clusters or processors are in an extremely close proximity to each other, cache data transfer lines between clusters or processors may be extremely short, to the limits of direct wiring from board to board inside the housing.

This tight, or close, proximity requires tightly coupled computer networks to be designed either as cluster processors housed in the single enclosure, or as VLSI chips. Cache coherency protocols for tightly coupled computer networks may be grouped in various ways, including the classical solution of informing all other caches of all writes, dynamic directory schemes maintaining a directory by filtering out unnecessary overhead, and bus based schemes based on the assumption that all system communications take place on a bus shared by clustered processors.

The principles of tightly coupled processors can be equally applied to processors connected over remote distances outside a singular enclosure. Coherency is still desirable for computer networks that are remotely connected. For ease of integration into legacy systems, this enhanced system should be manufacturable as a single chip solution, preferably in MOS technology on a monolithic silicon substrate, and not necessarily on more expensive GaAs (gallium arsenide) or BIMOS (Bipolar and MOS) technology. The ability to provide cache location information to the entire cluster so that the entire computer system can identify the location of the most recently updated information anywhere in the cluster is desirable. Also desirable is the ability to cache in a single location all transmissions which cross the system bus, to and from the loosely coupled processors, the associated memories and the input/output subsystems.

SUMMARY OF THE INVENTION

The problems outlined above are in large part solved by an improved transmit unit core that is tightly integrated into an enhanced cluster cache with controller. Broadly speaking, coherent memory transactions in a loosely coupled computer network are supported by sending all cache updates to all computers in the loosely coupled computer network through high speed, low latency and high bandwidth serial lines linking all computers to all other computers.

Additional features of the transmit unit may include the cluster cache controller optionally including a local cache controller and/or as a local bus controller. The local bus controller is operable to couple the cluster cache to an I/O subsystem. The local cache controller preferably couples through a local cache memory management unit ("MMU") to a local cache memory. Local cache memory preferably caches data and/or instructions, or locations thereof for the entire computer, making the local computer cache available to the entire computer cluster through the transmit unit.

The transmit unit is preferably embodied within a cluster cache, adapted for use in a computer of a loosely-coupled computer system, which also includes, in one embodiment, a timing generator for generating a clock signal for synchronized timing in the transmit unit, control registers for storing native format control data.

Each transfer unit is designed for transmitting and receiving serialized data. The transfer unit includes a receiver and a transmitter. The receiver includes a receive buffer which receives serialized data. Coupled to the receive buffer is a deserializer. The receiver further includes logic coupled to the deserializer which recovers a clocking signal from a deserialized signal, and coverts serialized data into native format data. The logic is henceforth referred to as a data/clock recovery unit. The data/clock recovery unit coupled to the deserializer recovers the native format data and synchronizes the native format data cache controllers that receive and process the native format data. A receive clock generator receives input from the data/clock recovery unit and maintains synchronization of the native format data. The transmitter receives outgoing data in their native formats and transmits the outgoing data in serialized form. Thus the transmitter includes a serializer coupled to a transmit buffer. Further included with the transmitter is a transmit clock generator which synchronizes serialization and transmission of the serialized data before sending the serialized data to the transmit buffer which holds the serialized data before transmission. The transfer unit is preferably a monolithic circuit, which is also preferably a complementary MOS (or complementary MOS) integrated circuit.

The cluster cache system disclosed is based on leading-edge phase-shifted, phase locked loop ("P-S PLL") technology. Embodied within the cluster cache system is a local cache controller and cache memory responsive to a respective controller. The cache controller sends and receives information (i.e., data and address indicia) to and from at least one transfer unit associated with each cluster cache system. One or more transfer units allow communication between several loosely coupled cluster cache systems, each of which embody a cluster cache controller and a bus interface unit coupled to a system bus. Each transfer unit is a full-duplex transceiver that includes transmitter and receiver functions. Each transfer unit can send and receive data simultaneously since operation of their transmitter and receiver functions are independent from each other and from activity on the system bus linking multiple processing subsystems.

BRIEF DESCRIPTION OF THE DRAWINGS

Other objects and advantages of the invention will become apparent upon reading the following detailed description and upon reference to the accompanying drawings in which:

FIG. 1 is a computer network having a plurality of computers loosely linked through high speed serial connections between cluster caches, according to one embodiment of the present invention;

FIG. 2A is another embodiment of a computer shown in FIG. 1, according to one embodiment of the present invention;

FIG. 2B is a prior art embodiment of a processing subsystem shown in FIG. 1;

FIG. 2C is a prior art embodiment of an I/O (input/output) subsystem shown in FIG. 1;

FIG. 3A is a block diagram representing the internal workings of the cluster cache of FIG. 1 according to one embodiment of the present invention;

FIG. 3B is a block diagram representing the internal workings of the cluster cache of FIG. 1 according to another embodiment of the present invention, related to the embodiment shown in FIG. 2A; and FIG. 4 is a diagram of one embodiment of a serial transceiver transfer unit according to the present invention.

DETAILED DESCRIPTION OF PREFERRED EMBODIMENTS

The use of a letter as part of a number designating a component of a system described in this document will be to show multiple instances of equivalent components. All figures will use a uniform numbering system with identical parts across the figures being given identical numbers.

Turning now to the drawings, FIG. 1 shows a computer network system 100 according to one embodiment of the present invention. System 100 includes a plurality of computers 110 illustrated in FIG. 1 as computer 110A, computer 110B, and computer 110BC. Each computer 110 is linked to every other computer 110 by at least one connection, preferably a high speed serial line 160 coupling the respective cluster caches 150 of each of the computers 110. High speed serial line 160 also preferably includes a return high speed serial line for return data transmissions.

Each computer 110 is preferably comprised of a system bus 140, a processing subsystem 120 coupled to the system bus 140, a memory subsystem 130 coupled to system bus 140, and I/O (input/output) subsystem 170 coupled to the system bus 140, and a cluster cache 150 also coupled to system bus 140. Other arrangements and couplings of computer system 110 are also contemplated. System bus 140 may also be designated as a memory bus 140. System bus 140 is preferably a parallel bus, that is, a plurality of data and address lines are used to convey data from one local subsystem to another. The computers 110 of computer system 100 may also be coupled through a computer network (not shown) for the transfer of data to and from other computer systems (not shown).

In FIGS. 2A, 2B, 2C, 3A, and 3B, various embodiments of computer 110A or the subsystems or components of computer 110A are illustrated. Computer 110A may be referred to as being "local", while computers 110B and 110C are "distal" from computer 110A. Computers 110B and 110C are contemplated as similar to any of the embodiments contemplated for computer 110A.

In FIG. 2A, an alternative embodiment of computer 110A according to the present invention is given. In this embodiment, the I/O subsystem 170A is coupled directly to the cluster cache 150A and may not couple directly to the system bus 140A. This allows the cluster cache 150A to act as a cache for all data transferred between the I/O subsystem 170A and the system bus 140A. This embodiment may be implemented in conjunction with the embodiment of the cluster cache 150A given in FIG. 3B.

FIG. 2B is illustrative of a typical configuration for processing subsystem 120A. One or more CPUs 200, with preferably included L1 caches 210, each couple directly to their respective L2 caches 220. The L2 caches 220 each also couple directly to system bus 140A. Any number of CPUs 200 and associated cache chains, including the use of L3 cache (not shown) are contemplated.

An embodiment of I/O subsystem 170A is shown in FIG. 2C. System control 230 couples to system bus 140A preferably through port 225, which may also be referred to as bus or connection 225. System control 230 couples to expansion (or I/O) bus 240 and may also couple directly to a video output 250, as is well known in the art. Also coupled to expansion bus 240 may be one or more of the following the I/O device 260, a source device 270 or multimedia device 280. System control 230 is sometimes called the chipset logic, while I/O device 260, storage device 270, and multimedia device 280 may be any one of a number of devices well known in the art which couple to expansion buses 240 or I/O buses 240. Any number of I/O devices 260, storage devices 270, and multimedia devices 280 may be coupled to the expansion bus 240, including none. Examples of expansion buses 240 include, but are not limited to, the AT bus, PCI bus, the VME bus, and buses adapted for various processors.

Referring now to FIG. 3A, a preferred embodiment of the cluster cache 150A is shown. The cluster cache 150A couples to system bus 140A with the interface to the system bus 140A occurring through bus interface unit 310. Bus interface unit 310 is also operable to route data to and from the cluster cache controller 320. Cluster cache controller 320 preferably is coupled to a cache data I/O unit 330 which is operable to route data to and from other computers 110 in the computer system 100.

Cache data and information for other computers 110 transfer to and from cluster cache 150A through transfer (xfer) units 340. As shown, transfer units 340A and 340B are coupled to cache data I/O unit 330 and also to one or more high speed serial lines 160. Each transfer unit 340 transmits and receives data through two ports 335 and 345. As shown, port 335 is the link between the transfer unit and the cache data I/O unit 330 on the local computer 110A, while port 345 is the link between the transfer unit 340 and its associated high speed serial line 160. Further details on the transfer unit 340 are given below with respect to FIG. 4.

Also coupled to cluster cache controller 320 is a cluster cache memory management unit (MMU) 350. Cluster cache MMU 350 controls data I/O to and from cluster cache memory 360. The cluster cache memory 360 is preferably cache tag memory only, but the cluster cache memory 360 may also comprise cache data memory and cache memory, or other combinations of memory for caching data, instructions, or locations thereof. The preferred size for the cluster cache memory 360 is two to four times the size of the L2 cache 220 for each CPU 200, although other sizes are contemplated.

In FIG. 3B, an alternative embodiment of cluster cache 150A is shown. This is a preferred embodiment for use with the embodiment of computer 110A shown in FIG. 2A. This alternative embodiment of cluster cache 150A differs from the previous embodiment primarily in the cluster cache controller 320. In this embodiment, cluster cache controller 320 preferably includes a local cache controller 325 as well as a local bus controller 315. The bus controller 315 is operable to couple the cluster cache 150A, through port 225, previously discussed with respect to FIG. 2C, to the I/O subsystem 170A. Local cache controller 325 preferably couples through a local cache MMU 355 to a local cache memory 365. Local cache memory 365 preferably caches data, instructions, or address information for the entire computer 110A.

Various embodiments of local cache memory 365 are contemplated, including the unification of the local cache memory 365 with the cluster cache memory 360. This unification of the local cache memory 365 and cluster cache memory 360 may also include a unification of the local cache MMU 355 and the cluster cache MMU 350, although that is not necessary. The advantages of the embodiment shown in FIG. 3B, include distally located computers 110B and 110C being able to get access to the local memory cache 365 of local computer 110A without tying up use of system bus 140A in computer 110A. Another advantage of this embodiment, is that I/O device 260, storage device 270 or multimedia device 280 are also capable of accessing caches on other computers 110 without tying up system bus 140A in computer 110A, and possibly the other computers' system buses 110.

A preferred operation of the cluster cache 150A as illustrated is to implement a "directory" based cache for the computer 110A and the computer cluster 100. If the data is "owned" by cluster cache 150A, cluster caches 150B and 150C would be informed over the high speed serial lines 160AB and 160AC that the data in that address is "owned" or "kept" by cluster cache 150A. If cluster cache 150B wants to read this address, it first looks in it's own directory and "discovers" that the data is not there (called a "read miss") but is "owned" by cluster cache 150A. Cluster cache 150B then generates a request to cluster cache 150A to send the data over the high speed serial line 160AB. If cluster cache 150B wants intends to write the data, it sends a request to "own" the data. Cluster cache 150A would then send the value of the data and a signal or "token" that recognizes that the owner is now cluster cache 150B. In general, cluster cache 150C would also be informed of the change in owner.

According to another embodiment, the caching scheme which uses a central directory can be implemented in computer 110A. In this case, ownership of particular lines in the cluster cache memory 360 is kept in the central directory, preferably in the cluster cache controller 320 or the cluster cache memory 360 although other locations may be chosen, and is updated with every transaction. In this case, the request goes to the directory, and the cluster cache 150A transfers the data and keeps track of who owns what. In this case, cluster cache 150C does not have to have any knowledge of the transaction between cluster caches 150A and 150B at all.

A preferred caching algorithm is a modified "MESI" algorithm as is well known in the art, although other caching algorithms are contemplated. Generally speaking, the information in the directory maintains the "state" or status of a given piece of memory. A piece of memory (called a "cache line") may be "modified" (the M state), which means that it is in the local cluster cache memory 360 and the only correct copy of that cache line is stored there. Alternatively, the cache line may be "exclusive" (the E state), which means that the only correct copy of that cache line is stored there, but it has not yet been changed by the owner of the local cluster cache memory 360. The cache line can also be "shared" (the S state), which means that there is more than one valid copy of the cache line, one in the local cluster cache memory 360 and the other in a different cluster cache 150B/C (This means that the local CPUs 200 can read this anytime, but if the local CPUs 200 wants to write to this cache line, it has to get the state to go to "exclusive" by sending the appropriate message to the other cluster caches 150B/C.). The cache line can also be "invalid" (the I state), which means that the local cluster cache memory 360 is not the owner of the most recent copy. (Thus, if the local CPU wants to do a read or write, it has to get the state to change from I to E or S, by sending the appropriate message to the other cluster caches 150B/C.).

This state data is written by the cluster cache controller 320 and is used to "track" or "remember" the state of each cache line as its status changes due to requests by processing units, such as CPUs 200, in the memory system. The overall goal is for the entire computer system 100 memory system to be "coherent", which means that when a datum is read from a memory location, the last datum that was written is the one that is returned. This is true even if the physical memory is separated over different computer boards or enclosures.

A diagram of a preferred embodiment of the internal workings of transfer unit 340 is shown in FIG. 4, included as part of the cluster cache 150A. Port 335 inputs and outputs native format data in parallel form. Input data are sent to the transmitter 400 to the serializer 420 for conversion into serial data for transmission on the high speed serial line 160. Prior to entering the serializer 420, the data are preferably encoded, using an encoding scheme such as 8B/10B which will be discussed later. A timing generator 405 provides a reference clock signal to the transmitter 400 to a TX clock generator 415 for clocking the serial data at the transmission speed of the high speed serial line 160 rather than the clock signal generated by the timing generator 405. Serialized data are then conveyed to a transmit buffer 430 before being output through port 345 onto the high speed serial line 160.

The serialized data stream incoming to transfer unit 340 is received at port 335 and input to receiver 410 to a receive buffer 440. The serialized data are transferred to a deserializer 450 which deserializes the data and transfers the deserialized data to data/clk recovery logic 460. The deserializer 450 also outputs clocking information to a RX clock generator 425. A reference clock signal from timing generator 405, along with clocking information from the deserializer 450 and the data/clk recovery logic 460 allows the RX clock generator 425 to recreate the true timing signal (receive clock signal) from the data. Thus the high speed serial line 160 is not required to transmit a separate clock signal. The data clock is recovered from the data themselves. The data in its native format is output in parallel, along with the recovered clock signal at port 335. The transfer unit 340 is preferably part of a monolithic integrated circuit that is also preferably a CMOS integrated circuit although other semiconductor materials may also be used.

Both serializer 420 and deserializer 450 functions are based on leading-edge P-S PLL technology. Each transfer unit 340 is a full-duplex transceiver that includes transmitter and receiver functions. Each transfer unit 340 can send and receive data simultaneously since operation of their transmitter and receiver functions are independent.

Using timing generator 405, the transmitter function preferably latches either 10- or 20-bit parallel data at port 345 and transmits it at a rate up to 1.25-Gbit/sec over high speed serial line 160. With 20-bits of data and a 62.5-MHz clock, data can be transmitted at 1.25-Gbit/sec over high speed serial line 160. Concurrently, the receiver function deserializes a Gbit/sec return data stream, recovers a clock (RBC) from the bit stream, and outputs 20-bit parallel data at the RBC frequency or 10-it parallel at twice the RBC frequency.

In one embodiment, the bit stream is transmitted in a non-return to zero (NRZ) format on a low-swing differential pair. From the differential pair, the receiver function accepts the Gbit/sec serial bit stream. The receiver function then deserializes the bit stream, recovers the embedded clock, recovers parallel data, optionally aligns data on a selectable sync pattern, and outputs the recovered parallel data either 10- or 20-bits at a time. The sync pattern and width of the recovered data are selectable via input signals.

In order to send random data patterns, 8B/10B or similar encoding/decoding scheme is used to dc-balance the bit stream before it is serialized. At extremely high speeds of over a Gbit/sec, the system designer cannot afford to have more binary 1s than 0s or vice versa on the serial line. The number of 1s and 0s must be about equal. Also, a transition within ten bits must be guaranteed in order for the receiver PLL to stay in lock. The 8B/10B encoding is described in U.S. Pat. No. 4,486,739, titled Byte Oriented DC Balanced (0,4) 8B/10B Partitioned Block Transmission Code, which is hereby incorporated by reference in its entirety. While 8B/10B encoding provides many useful features, such as dc balancing and a guaranteed transition every 5 bits, the only requirement for the chosen encoding scheme is that one transition is guaranteed every 10 bits.

Phase-shift, phase-lock loops (PS-PLL) are used in both clock generators 415 and 425. At the base end, the PLL takes in a lower speed system clock and uses several phase shifts to generate a gigahertz clock. Without this advanced PLL design, these speeds could not be achieved in CMOS technology. A PLL guard ring isolates it from other digital logic on the chip and reduces substrate noise. In the receiver, the PS-PLL performs oversampling of the incoming bit streams and recovers data bits reliably.

The entire cluster cache 150A is preferably a single monolithic integrated circuit. This single monolithic integrated circuit is preferably CMOS but may also be composed of other semiconductor materials as desired.

It will be appreciated to those skilled in the art having the benefit of this disclosure that this invention is believed to be capable of serially transmitting and receiving cache data to and from distant computers 110 in a computer system 100 allowing for easy cache coherency in non-localized computer system 100. It is intended that the following claims be interpreted to embrace all such modifications and changes and, accordingly, the specification and drawings are to be regarded in an illustrative rather than a restrictive sense.

What is claimed is:

1. A computer system, comprising:
   a first central processing unit (CPU) operably coupled to access a first cluster cache via a first cluster cache controller, wherein the first cluster cache is coupled to a first I/O subsystem through a path not including a first system bus coupled between the first CPU and the first cluster cache;
   a second central processing unit (CPU) operably coupled to access a second cluster cache via a second cluster cache controller, wherein the second cluster cache is coupled to a second I/O subsystem through a path not including a second system bus coupled between the second CPU and the second cluster cache;
   a differential serial line, adapted to transfer data between the first and second cluster cache controllers; and
   a directory, operably coupled to the first and second cluster cache controllers via the differential serial line, and providing information on whether a most recent version of data requested by either CPU is present in either cluster cache.

2. The computer system as recited in claim 1, wherein the information in the directory further comprises cluster cache contents or status.

3. The computer system as recited in claim 2, wherein the cluster cache status comprises "modified", "exclusive", "shared" and "invalid" states, which are attributes of cached data according to a modified MESI cache management algorithm.

4. The computer system as recited in claim 1, wherein the first CPU is adapted to seek data in the first cluster cache before seeking it in the second cluster cache.

5. The computer system as recited in claim 1, further comprising individual directories associated with both the first and second CPUs, such that each directory provides information on whether a most recent version of data requested by either CPU is present in either cluster cache.

6. The computer system as recited in claim 5, wherein information in either directory may be transmitted via the differential serial line to the other directory.

7. The computer system as recited in claim 1, wherein each CPU is operably coupled to a memory subsystem, to its respective cluster cache, and to an I/O subsystem by a system bus.

8. The computer system as recited in claim 7, wherein the memory subsystem comprises a local cache.

9. The computer system as recited in claim 1, wherein the directory is within the first cluster cache controller.

10. The computer system as recited in claim 1, further comprising a serial transfer unit, operably coupled to each cluster cache controller, wherein said serial transfer units are adapted to convert between parallel and serial data format, and are adapted to drive serial data upon the differential serial line and receive serial data from the differential serial line.

11. The computer system as recited in claim 10, wherein the serial transfer unit comprises:
    a timing generator, which generates a synchronous reference clock;
    a serializer, which transforms parallel input data into serial format;
    a transmit clock generator, which generates a timing signal used by the serializer;
    a deserializer, which transforms serial input data into parallel format;
    a receive clock generator, which generates a timing signal used by the deserializer;
    a receive buffer, which couples the input of the deserializer to the differential serial line; and
    a transmit buffer, which couples the output of the serializer and deserializer to the differential serial line.

12. The computer system as recited in claim 1, wherein first and second CPUs, cluster caches, and cluster cache controllers are all contained upon a monolithic substrate, comprising a CMOS integrated circuit.

13. A computer system, comprising:
    a first cluster cache, operably coupled to a first central processing unit (CPU) and to a first memory subsystem via a first system bus, and coupled, through a path not including the first system bus, to a first I/O subsystem by a first port;
    a second cluster cache, operably coupled to a second central processing unit (CPU) and to a second memory subsystem via a second system bus, and coupled, through a path not including the second system bus, to a second I/O subsystem by a second port; and
    a differential serial line, adapted to transfer data between the first and second cluster caches.

14. The computer system as recited in claim 13, wherein the memory subsystem comprises a local cache.

15. A method for coordinating shared access to cache memory resources by first and second CPUs, comprising:
    coupling a first cluster cache and a first local cache to a first central processing unit (CPU) via a first system bus;
    coupling the first cluster cache and first local cache to a differential serial line, through a path not including the first system bus;
    coupling a second cluster cache and a second local cache to a second central processing unit (CPU) via a second system bus;
    coupling the second cluster cache and second local cache to the differential serial line, through a path not including the second system bus; and
    transferring data between the first and second cluster caches via a differential serial line.

16. The method as recited in claim 15, further comprising transferring data between the first and second local caches via a differential serial line, without utilizing the first or second system bus.

* * * * *